United States Patent
Bailleul et al.

(10) Patent No.: US 6,688,714 B1
(45) Date of Patent: Feb. 10, 2004

(54) BIT-RATE MODIFICATION

(75) Inventors: Nicolas Bailleul, Paris (FR); Etienne Fert, Paris (FR); Pierre Gautier, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/508,303

(22) PCT Filed: Jul. 9, 1999

(86) PCT No.: PCT/EP99/04932

§ 371 (c)(1),
(2), (4) Date: Mar. 9, 2000

(87) PCT Pub. No.: WO00/03544

PCT Pub. Date: Jan. 20, 2000

(30) Foreign Application Priority Data

Jul. 10, 1998 (EP) ............................. 98401765

(51) Int. Cl.[7] .............................................. H04B 17/00
(52) U.S. Cl. ......................................... 375/225; 375/272
(58) Field of Search ................................ 375/225, 372, 375/240.28, 240.23, 240.24; 370/537, 538, 546; 348/446, 404, 403, 419, 423, 464

(56) References Cited

U.S. PATENT DOCUMENTS

| | | | | |
|---|---|---|---|---|
| 6,160,846 A | * | 12/2000 | Chiang et al. | 375/240.05 |
| 6,160,915 A | * | 12/2000 | Kato et al. | 382/232 |
| 6,240,137 B1 | * | 5/2001 | Kato | 375/240.26 |
| 6,504,850 B1 | * | 1/2003 | Kato et al. | 370/465 |
| 6,516,002 B1 | * | 2/2003 | Huang et al. | 370/468 |

* cited by examiner

*Primary Examiner*—Emmanuel Bayard

(57) ABSTRACT

The bit rate of a data stream having the following characteristics is modified. The data stream includes control words, each of which defines when a data portion of the data stream has to be read from an input buffer at a receiving end. An MPEG video stream has such characteristics.

It is calculated, for at least one future instant in time (Tfut), within which bounds (Rmax, Rmin) the bit rate (R) of the data stream can be modified at that future instant of time, so as to cause neither underflow nor overflow of the input buffer. The bit rate is modified at a future instant in time within the bounds (Rmax, Rmin) which have been calculated for the future instant in time. This allows a fast modification of the bit rate which generally contributes to the quality of the data comprised in the data stream.

6 Claims, 6 Drawing Sheets

BIT-RATE MODIFICATION

FIELD OF THE INVENTION

The invention relates to modifying the bit rate of a data stream having the following characteristics. The data stream comprises control words. A control word defines when a data portion comprised in the data stream has to be read from an input buffer at a receiving end. A video data stream in accordance with a standard of the Moving Pictures Experts Group (MPEG), has such characteristics.

BACKGROUND ART

U.S. Pat. No. 5,680,483 describes an MPEG encoder with switchable bit rates.

SUMMARY OF THE INVENTION

It is an object of the invention to allow a better quality of the data comprised in the data stream.

The invention takes the following aspects into consideration. Let it be assumed that, at a certain instant, it is established that the bit rate of a data stream should be increased in order to maintain a certain level of quality. Ideally, the bit rate is modified instantly. That is, ideally, an immediate response is given to a demand for bits. However, for a data stream having the characteristics mentioned hereinbefore, the bit rate can not immediately be modified. If the bit rate were immediately modified, this would probably cause underflow or overflow of the input buffer at the receiving end. In that case, data would be lost which is detrimental to quality.

The background art seems to apply the following principle. The bit rate is modified only after every control word which has already been defined, has taken effect at the receiving end. In MPEG terminology this means that the bit rate is modified with a delay corresponding to the end-to-end delay. Accordingly, it is ensured that neither underflow nor overflow will occur whatever the bit-rate modification is.

According to the invention, it is calculated, for at least one future instant in time, within which bounds the bit rate of the data stream can be modified at that future instant in time so as to cause neither underflow nor overflow of the input buffer. The rate is modified at a future instant in time, within the bounds which have been determined for the future instant in time.

Accordingly, the invention allows to modify the bit rate within a relatively short delay while preventing underflow and overflow. It may happen the bit rate can not be switched, as it were, to a certain desired bit rate within a relatively short delay. However, the bit rate can be switched to an approximation of the desired bit rate, the approximation being one of the aforementioned bounds. The latter will generally provide a better response to a demand for bits, than waiting for a relatively long fixed delay in order to apply the desired bit rate such as in the background art. Consequently, the invention allows a better quality of the data comprised in the data stream.

The invention and additional features, which may be optionally used to implement the invention to advantage, are apparent from and will be elucidated with reference to the drawings described hereinafter.

DETAILED DESCRIPTION OF THE DRAWINGS

The following remarks relate to reference signs. Like entities are designated by like letter references in all the Figures. Several similar entities may appear in a single Figure. In that case, a digit or a suffix is added to the letter reference in order to distinguish like entities. The digit or the suffix may be omitted for convenience or it may be replaced by an asterisk in the case where its value is not important (do not care value). This applies to the description as well as the claims.

Figure 1:
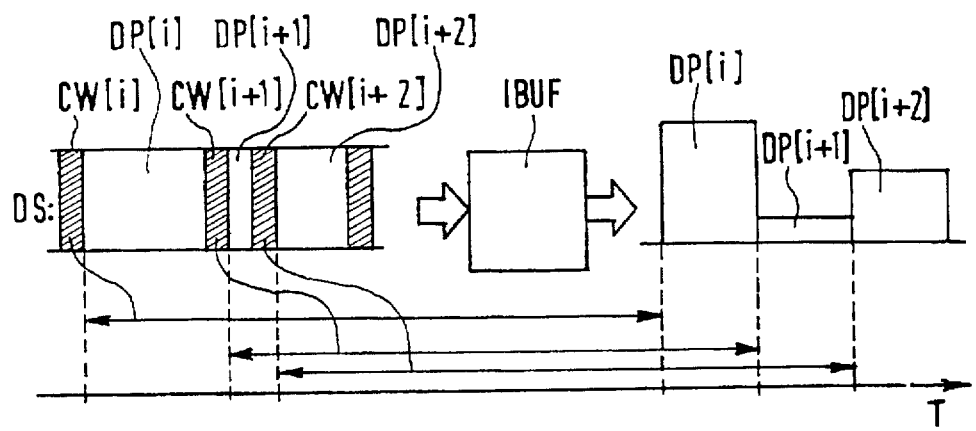
FIGS. 1 and 2 are conceptual diagrams illustrating basic features of the invention as claimed in claim 1.

FIG. 1 illustrates the following features. A data stream DS comprises control words CW. A control word CW[i] defines when a data portion DP[i], which is comprised between the control word and a subsequent control word CW[i+1], has to be read from an input buffer IBUF at a receiving end.

Figure 2:
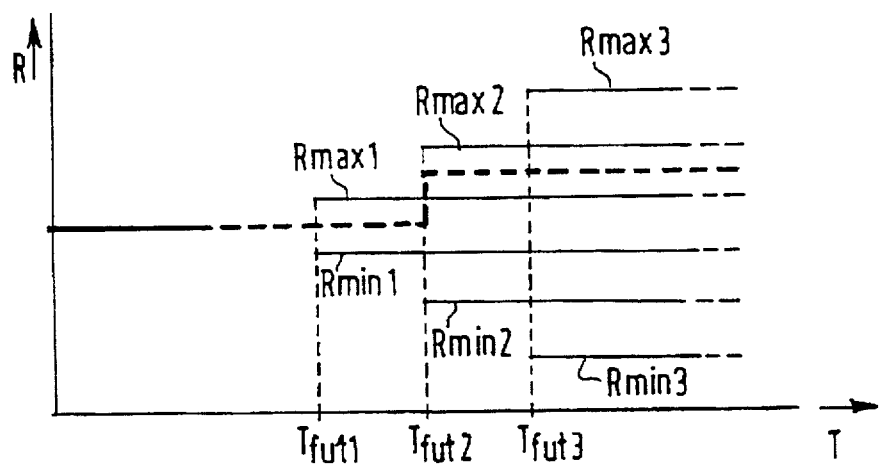

FIG. 2 illustrates the following features. It is calculated, for at least one future instant in time Tfut, within which bounds Rmax, Rmin the bit rate R of the data stream can be modified at that future instant in time Tfut, so as to cause neither underflow nor overflow of the input buffer. The bit rate is modified at a future instant in time Tfut2 within the bounds Rmax2,Rmin2 which have been calculated for the future instant in time Tfut2.

Figure 3:
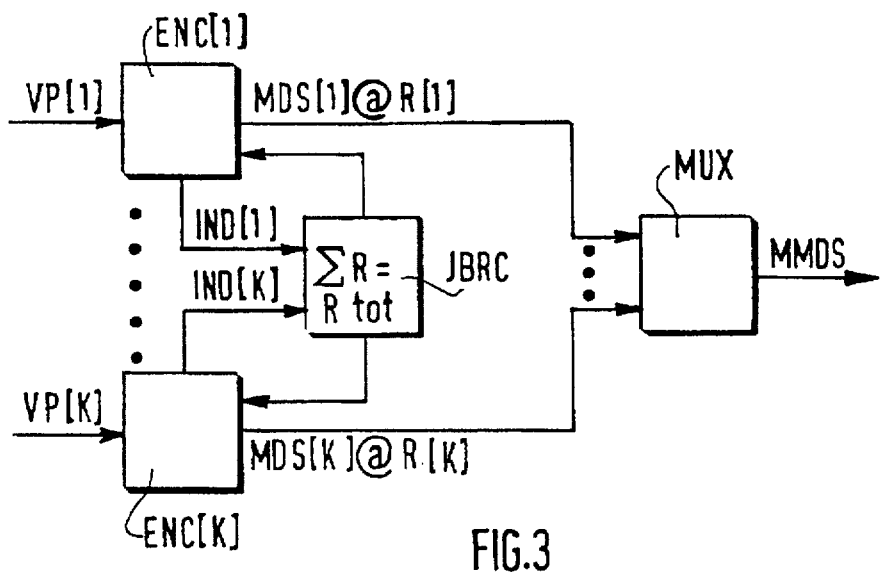
FIG. 3 is a block diagram illustrating an example of a video encoder assembly in accordance with the invention.

FIG. 3 illustrates an example of a video encoder assembly in accordance with the invention. The video encoder assembly receives several video programs VP and, in response, provides a multiplex MPEG data stream MMDS. The multiplex MPEG data stream MMDS contains an MPEG encoded version of each video program VP. The video encoder assembly comprises several encoders ENC, a multiplexer MUX and a joint bit-rate controller JBRC.

The video encoder assembly basically operates as follows. Each encoder ENC encodes a different video program and provides an MPEG data stream MDS to the multiplexer. The multiplexer combines the MPEG data streams so as to obtain the multiplex MPEG data stream MMDS. Each encoder further establishes a bit-rate control indication IND with each picture in the video program it encodes. The bit-rate control indication is an estimation of how difficult it is, or how easy, to encode the current picture and a number subsequent pictures. A picture is difficult or easy to encode if, for a given quality, the coding of the picture produces relatively many or relatively few bits, respectively.

The joint bit-rate controller partitions a total bit rate Rtot among the video encoders on the basis of the bit-rate control indications it receives. That is, the joint bit-rate controller allocates a certain bit rate R to each encoder, the sum of these bit rates being the total bit rate. An encoder supplies its MPEG data stream to the multiplexer at the bit rate it has been allocated. The joint bit-rate controller will allocate a higher bit-rate to an encoder receiving pictures which are difficult to encode than an encoder receiving pictures which are easy to encode. By doing so, the joint bit-rate controller maintains a substantially constant quality ratio between encoded pictures provided by the respective encoders. Furthermore, the joint bit-rate controller helps the respective encoders to provide successive encoded pictures at a substantially constant quality. This will be explained in greater detail hereinafter.

Figure 4:
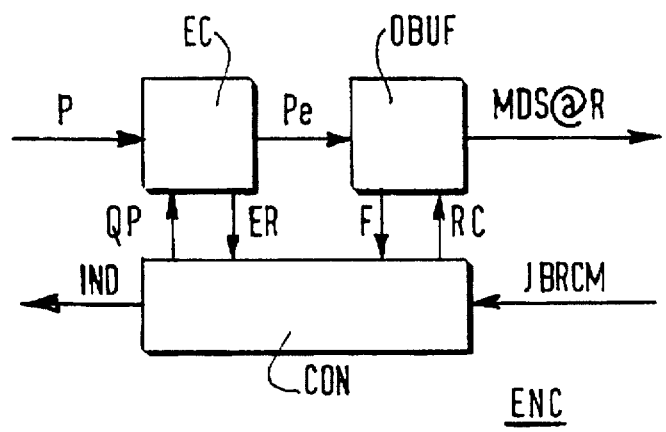
FIG. 4, is a block diagram illustrating an encoder which forms part of the video encoder assembly illustrated in FIG. 3.

FIG. 4 illustrates an encoder ENC which forms part of the video encoder assembly illustrated in FIG. 3. The encoder comprises encoding circuitry EC, an output buffer OBUF and a controller CON. It basically operates as follows. The encoding circuitry encodes successive pictures P in dependence on a quantization parameter QP. The encoding circuitry supplies encoded pictures Pe to the output buffer OBUF. The output buffer outputs the encoded pictures in the form of an MPEG data stream having a bit rate R.

There are three types of encoding in accordance with which a picture may be encoded: I-type, P-type and B-type encoding. A picture which is I-type, P-type or B-type encoded will be referred to as I-, P- and B-picture, respectively, hereinafter. Furthermore, there is a cyclic pattern in the type of encoding which is applied. Each cycle begins with an I-type encoding and is followed by one or more P- and B-type encodings. A cycle covers N pictures, N being an integer. For example, for N=6, the cyclic encoding pattern may be I-B-B-P-B-B.

The controller controls the bit rate on the basis of joint-bit rate control messages JBRCM it receives from the joint bit-rate controller. A joint bit-rate control message defines a bit rate for the encoder and further defines when this bit rate has to be applied. Thus, in effect, the joint-bit rate control messages define a bit rate profile for the encoder. The controller controls the bit rate in accordance with the bit-rate profile. It does so by means of a bit-rate control signal RC which determines the rate at which encoded picture data is read from the output buffer.

The quantization parameter substantially determines the quality of the encoded pictures. The lower its value while encoding a picture, the higher the quality of the encoded picture is, but the more bits the encoded picture will comprise. The quantization parameter should preferably have a value which is substantially constant and as low as possible without causing underflow or overflow in an input buffer of a decoder receiving the MPEG data stream.

The controller controls the quantization parameter on the basis of several parameters. One parameter is the bit-rate profile as defined by the joint bitrate control messages. Another parameter is the amount of encoded data F contained in the output buffer. These two parameters define the room, in terms of number of bits, which is available for encoding a group of pictures. Another parameter used for quantization parameter control, are encoding results ER. The encoding results provide information on how to partition the available room among the pictures such that the quantization parameter has a substantially constant value. An encoding result for a picture, or a portion thereof, may be expressed as follows: the number of bits produced by the encoding of the picture, or its portion, multiplied by the quantization parameter value which has been applied. This product will hereinafter be referred to as complexity.

The encoder may operate in a single-pass mode or in a double-pass mode. In the single pass mode, the encoding circuitry encodes a pictures only once. That is, a picture passes the encoding circuitry, as it were, only once. During that single pass, the controller controls the quantization parameter using encoding results relating to previous pictures only. In the double-pass mode, the encoding circuitry encodes a picture twice. That is, a picture passes the encoding circuitry, as it were, twice. In the first pass, the picture is encoded while the controller applies a fixed quantization parameter. The first pass serves to obtain encoding results relating to the picture. In the second pass, the controller controls the quantization parameter as described hereinbefore using the encoding results obtained in the first pass. Thus, the quantization parameter control will generally be better in the double pass mode than in the single pass mode.

The controller further establishes a bit-rate control indication IND with each picture to be encoded. In the single-pass mode, the encoder establishes the bit-rate control indication on the basis of encoding results relating to preceding pictures only. In the dual-pass mode, the encoder establishes the bit-rate control indication on the basis of encoding results which include an encoding result of the current picture.

Figure 5:
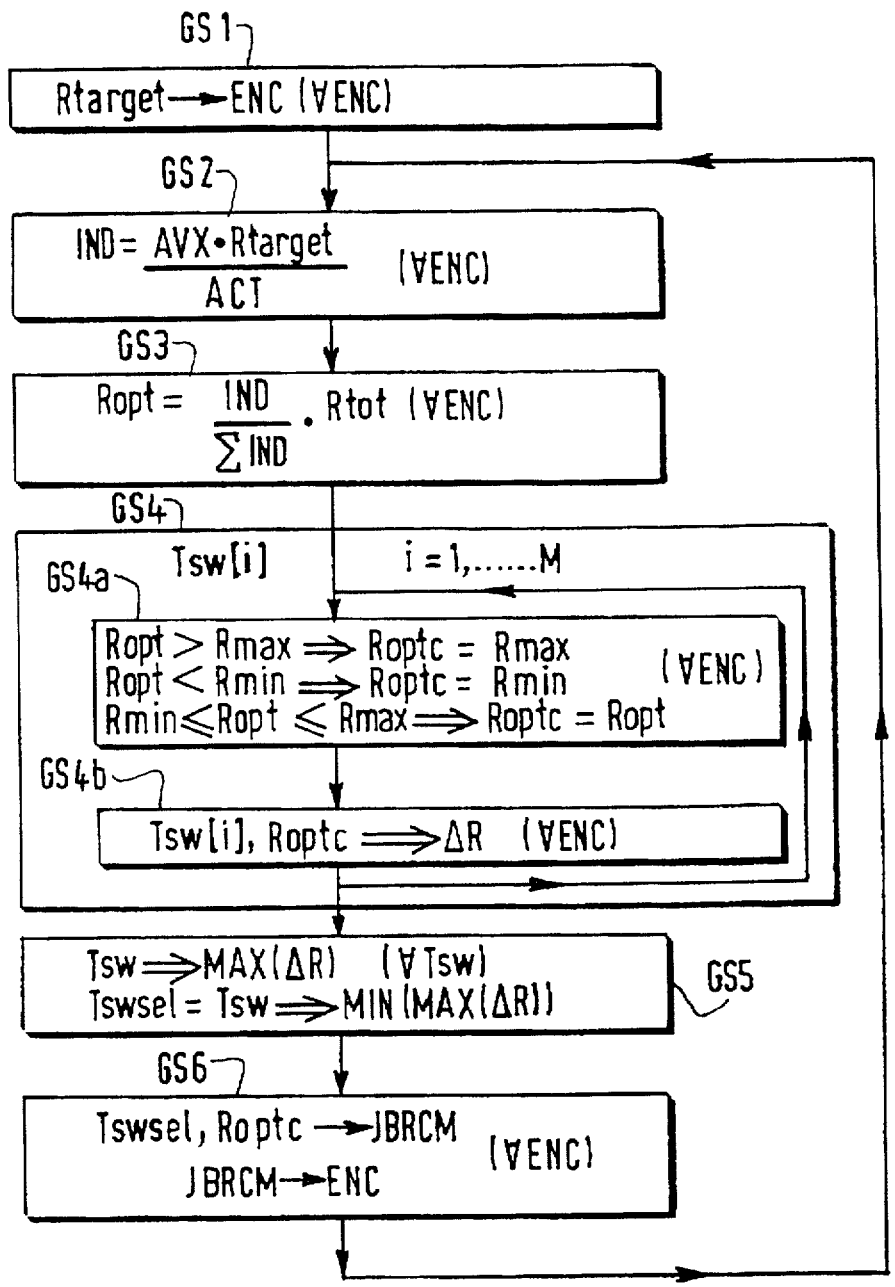
FIG. 5 is a flow chart illustrating a method of joint bit-rate control for the video encoder assembly illustrated in FIG. 3.

FIG. 5 illustrates a method of joint bit-rate control for the video encoder assembly illustrated in FIG. 3. In an initialization step GS1, the joint-bit rate controller assigns a target bit rate Rtarget to each encoder ENC. The target bit rate Rtarget determines the average quality of the encoded pictures provided by the encoder concerned.

The following series of steps are carried out repetitively. For example, they may be carried out every picture period.

In an indication-calculation step GS2, each encoder calculates a bit-rate control indication IND and sends the bit-rate control indication to the joint bit-rate controller. The bit-rate control indication may be calculated as follows. The bit-rate control indication is an average picture complexity AVX multiplied by the target bit rate for the encoder divided by a measure of luminance entropy ACT. The average picture complexity is calculated as follows. It is assumed that for the N−1 subsequent pictures each I-, P- and B-picture has a complexity which is that of the most recent encoded I-, P- and B-picture, respectively. The average picture complexity is then the average complexity of the current picture and the N−1 subsequent pictures. The luminance entropy is the average of macro block activities in the most recent encoded picture which is the previous picture in the single-pass mode or the current picture in the dual-pass mode. Macro block activity is defined in the document ISO/IEC JTC1/SC29/WG11/N0400, April 1993, "Test Model 5, Draft Revision 2", section 5.2.2, page 60.

In a bit-rate calculation step GS3, the joint bit-rate controller calculates, for each encoder, an optimal bit rate Ropt which should ideally be allocated to the encoder. The optimal bit rate for an encoder is the bit-rate control indication of the encoder divided by the sum of all bit-rate control indications multiplied by the total bit-rate. Thus, in effect, the optimal bit rate is a portion of the total bit rate. The size of the portion corresponds to the contribution which the bit-rate control indication makes to the sum of all bit rate control indications.

In switch-time examination step GS4, a number of different switch times Tsw are examined. A switch time is an instant when the bit-rates of the respective MPEG data streams may be modified. Some switch times, or even all switch times, may be sooner than the current instant plus a constant end-to-end delay. The constant end-to-end delay is the difference between the instant when an encoded picture is written into the output buffer of an encoder, and the instant when the encoded picture is read from an input buffer of a hypothetical decoder which is directly coupled to the encoder. That is, there is no transmission delay between the encoder and the hypothetical decoder.

The switch-time examination step GS4 comprises two sub-steps which are carried out for each switch time individually.

In a bit-rate clipping sub-step GS4a, the joint bit rate controller establishes a clipped optimal bit rate Roptc for each encoder in the following manner. The joint-bit rate controller first calculates a maximum new bit rate Rmax and a minimum new bit rate Rmin for MPEG-2 compliance of the encoder. The encoder is MPEG-2 compliant if the MPEG data stream it provides neither causes underflow nor overflow in a decoder input buffer. Overflow will occur if the new bit rate exceeds the maximum new bit rate and underflow will occur if the bit new rate is below the minimum new bit rate. The manner in which the joint bit-rate controller calculates the minimum new bit rate and the maximum new bit rate will be explained in greater detail hereinafter. The clipped optimal bit rate is the optimal bit rate defined hereinbefore unless the optimal bit rate causes underflow or overflow. In that case, the clipped optimal bit rate is the minimum bit rate or the maximum bit rate, respectively.

In a delta-rate calculation sub-step GS4b, the joint bit rate controller calculates for each encoder a delta rate $\Delta R$. It is assumed that the bit rate is switched to the clipped optimal bit rate at the switch time under investigation. The joint bit-rate controller calculates the average bit rate which will then be obtained over a time interval covering the current picture and the N−1 subsequent pictures. The delta rate is difference between the optimal bit rate and the average bit rate thus calculated. Ideally, the delta rate should be zero for each encoder.

In a switch-time selection step GS5, one of the investigated switch times is selected in the following manner. For each switch time, it is established which delta rate has highest value. This delta rate will be referred to as maximum delta rate. The higher the delta rate is, the more the bit rate concerned deviates from the optimal bit rate and, therefore, the greater the deviation from a desired quality ratio between the MPEG data streams. The switch time for which the maximum delta rate has the lowest value, is selected: Tswsel=Tsw⇒MIN(MAX($\Delta R$)).

In a bit-rate control step GS6, the joint bit-rate controller sends a joint bit-rate control message JBRCM to each encoder. The joint bit-rate control message specifies the selected switch time. It further specifies the clipped optimal bit rate for the encoder which applies to the selected switch time. Thus, the joint-bit rate controller programs each encoder to provide its MPEG data stream at the clipped optimal bit rate once the selected switch time is reached. Until that time, the respective encoders output their MPEG data streams as defined in previous bit-rate control messages.

Figure 6:
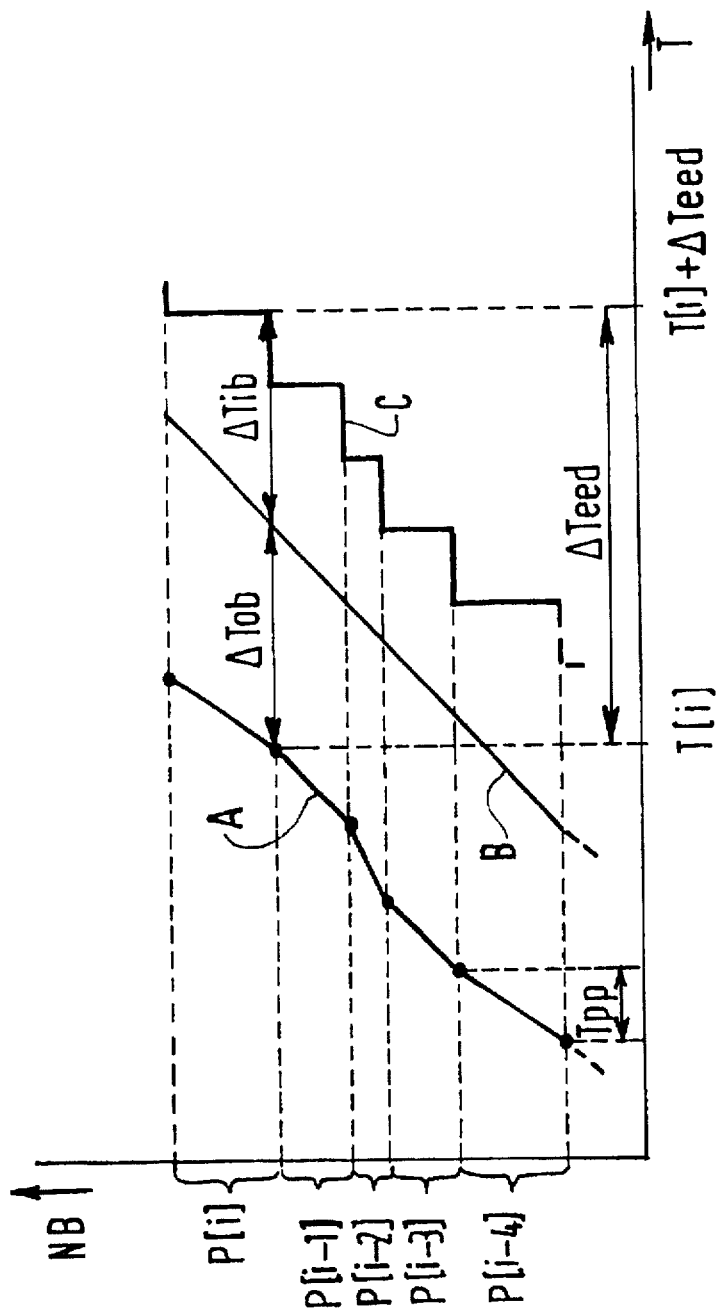
FIG. 6 is a graph illustrating, for an encoder in the video encoder assembly illustrated in FIG. 3, transfer of encoded data via the output buffer of the encoder and via the input buffer of a hypothetical decoder.

FIG. 6 illustrates, for an encoder in the video encoder assembly illustrated in FIG. 3, transfer of encoded data via the output buffer of the encoder and via the input buffer of a hypothetical decoder. FIG. 6 is a graph of which the horizontal axis represents time T and of which the vertical axis represents amount of encoded data NB produced by the encoder in terms of number of bits. The vertical axis further indicates to which picture P the encoded data belongs. The amount of encoded data grows with each successive picture P which has been encoded.

The graph illustrated in FIG. 6 comprises three curves: A, B and C. Curve A represents encoded data which is written into the output buffer of the encoder. For example, curve A shows that encoded data belonging to picture P[i] is written into the output buffer at instant T[i]. Each picture period Tpp, a new picture is written into the output buffer.

Curve B represents encoded data which is read from the output buffer so as to form the MPEG data stream. The slope of curve B is defined by the bit rate of the MPEG data stream. Curve B shows, for example, that encoded data belonging to picture P[i] is read from the output buffer after a delay $\Delta$Tob with respect to instant T[i]. It is assumed that the hypothetical decoder receives the MPEG data stream without any transmission delay. As a result, curve B also represents encoded data which is written into the input buffer of this decoder. That is, picture P[i] is written into the input buffer at instant T[i]+$\Delta$Tob.

Curve C represents encoded data which is read from the input buffer of the hypothetical decoder. It is assumed that a picture is read instantly from the input buffer. That is, it takes no time to read a picture. For example, curve C shows that encoded data belonging to picture P[i] is instantly read from the input buffer at instant T[i]+$\Delta$Teed. $\Delta$Teed represents a constant end-to-end delay. The constant end-to-end. delay is thus the difference between the instant when a picture has been written into the output buffer of the encoder, and the instant when a picture has been read from the input buffer of the hypothetical decoder. It holds that $\Delta$Teed=$\Delta$Tob+$\Delta$Tib, $\Delta$Tib representing an input buffer delay. The input buffer delay defines when a picture should be read from an input buffer of a decoder.

At any instant, the amount of data contained in the input buffer of the hypothetical decoder is the difference between curve B and C at that instant. For MPEG compliance, this amount of data should remain between an upper bound and a lower bound. If this is the case, it is ensured that any MPEG-compliant decoder which receives the MPEG data stream will neither underflow or overflow. In this respect, any transmission delay between encoder and decoder plays no role. This is because the MPEG data stream comprises control words which define for each picture when the picture has to be read from the input buffer. These control-words define $\Delta$Tib for each picture such that $\Delta$Tob+$\Delta$Tib=$\Delta$Teed. Consequently, it always holds that the amount of data contained in the input buffer of the hypothetical decoder, will also be contained in the input buffer of a real decoder after a delay $\Delta$Ttrans, $\Delta$Ttrans being the transmission delay. Consequently, if the input buffer of the hypothetical decoder never underflows nor overflows, the input buffer of the real decoder will neither.

Let it be assumed that the current time is instant T[i]: picture P[i] is just about to be encoded and, consequently, just about to be written into the output buffer of the encoder. This implies that any instant later than T[i] is the future. It has already been mentioned that any encoded picture which is written into the output buffer will be read from the input buffer after a delay $\Delta$Teed. Consequently, the future of curve C can exactly be predicted within a time interval which extends $\Delta$Teed from the current time. It solely depends on the future of curve B within the same time interval whether there will be underflow or overflow, or neither of those two. The future of curve B is defined by a bit rate profile for the MPEG data stream. The bit rate profile is determined by the joint bit-rate controller as explained hereinbefore with reference to FIG. 5.

Figure 7:
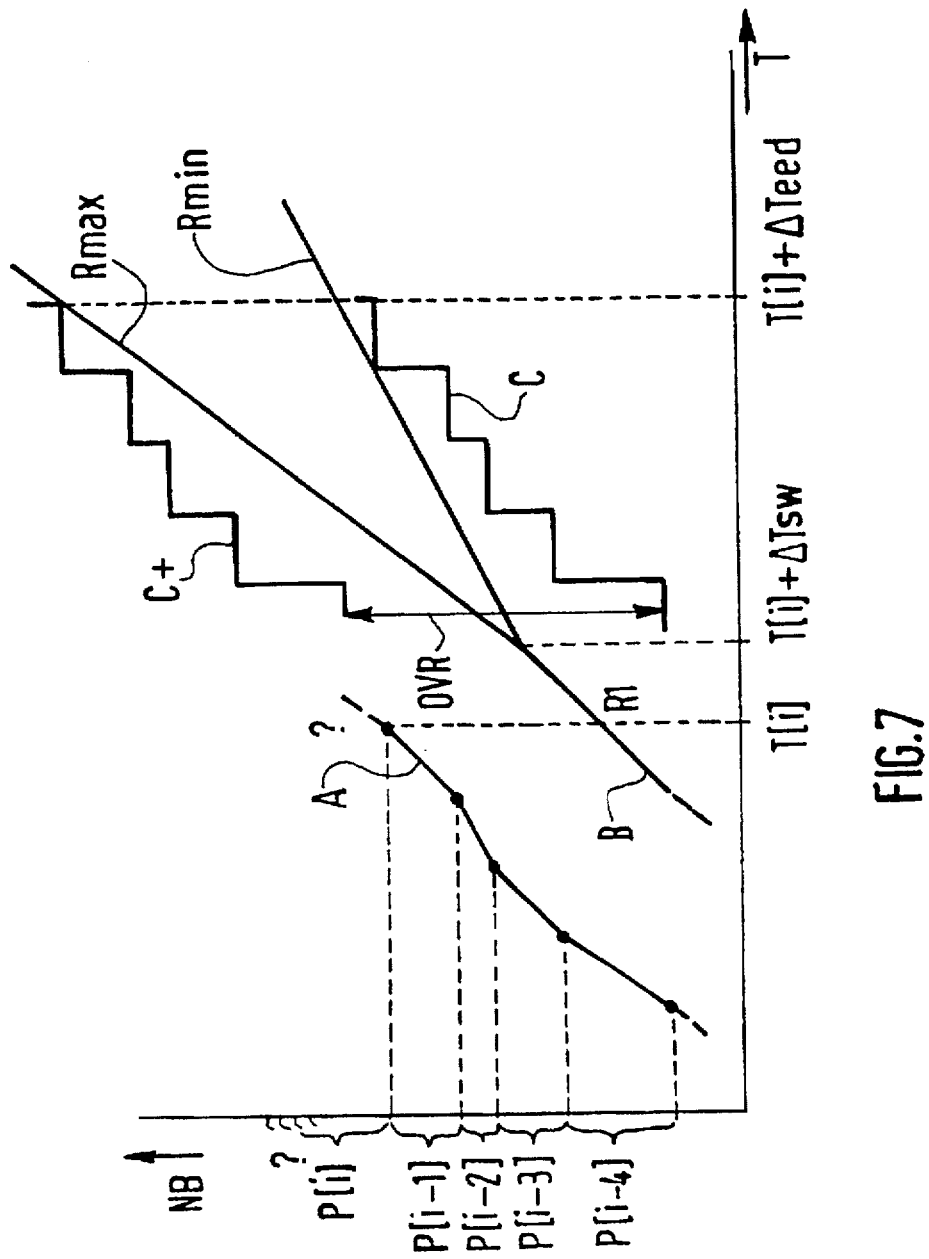
FIG. 7 is a graph illustrating a method of calculating a minimum new bit rate and a maximum new bit rate for an encoder in the FIG. 3 video encoder assembly.

FIG. 7 illustrates a method of calculating a minimum new bit rate and a maximum new bit rate for an encoder in the FIG. 3 video encoder assembly. The calculation applies for a bit-rate switch at a future instant $T[i]+\Delta Tsw$, with $\Delta Tsw$ being comprised between 0 and $\Delta Teed$. FIG. 7 is a graph which recaptures the features of the graph illustrated in FIG. 6. For the sake of simplicity, it is assumed that the bit rate is substantially constant and equal to R1 until $T[i]+\Delta Tsw$. The amount of data below which the input buffer will underflow is supposed to be zero. The amount of data beyond which the input buffer will overflow is supposed to be OVR. The graph illustrated in FIG. 7 comprises a curve C+ which is curve C lifted by an amount equal to OVR.

Curve B. is extended with two slopes: Rmin and Rmax. Slope Rmin indicates the minimum new bit rate below which underflow will occur. Slope Rmin touches one point of curve C only. If slope Rmin were less steep, underflow would occur. Slope Rmax indicates the maximum new bit rate beyond which overflow will occur. Slope Rmax touches one point of curve C+ only. If slope Rmax were steeper, overflow would occur.

The joint bit-rate controller can calculate curve C and C+ for each encoder on the basis of messages provided by the encoder. A message may, for example, indicate the amount of encoded data contained in an encoded picture and the instant when the encoded picture will be read from the input buffer of the hypothetical decoder. The joint bit-rate controller can also calculate curve B until the instant $T[i]+\Delta Tsw$ on the basis of the bit-rate profile of the encoder. The bit-rate profile is determined by the joint-bit rate controller itself. Thus, for calculation of curve B, it is sufficient that the joint-bit rate controller memorizes the bit-rate control messages it has supplied to the-encoder in a recent past. Once curve C and C+ have been calculated for the time interval between $T[i]$ and $T[i]+\Delta Teed$, and curve B has been calculated for the time interval between $T[i]$ and $T[i]+\Delta Tsw$, the joint bit rate controller can calculate the minimum and maximum new bit rate which may be applied at the switch time $T[i]+\Delta Tsw$.

Figure 8:
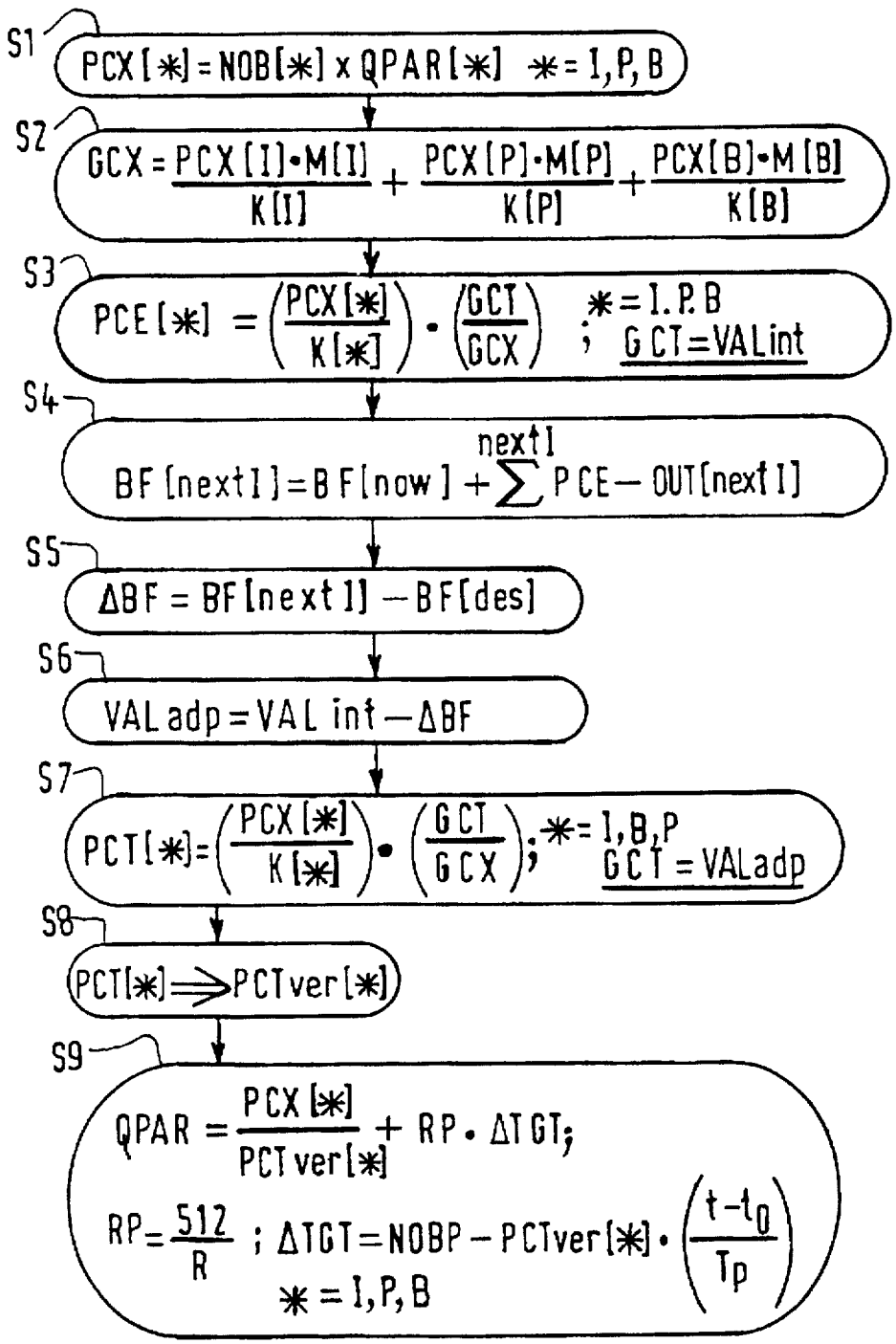
FIG. 8 is a flow chart illustrating an example of a method of quantization parameter control for the encoder illustrated in FIG. 4.

FIG. 8 illustrates an example of a method of quantization parameter control in the encoder illustrated in FIG. 4. The method comprises a plurality of steps. S1–S9 which are carried out for each picture P. The steps S1–S9 may also be carried out for each slice in the picture P. It is assumed that the encoder operates in the single pass mode described hereinbefore. It should be noted that, in MPEG, there are three different types of encoding a picture: an I-type encoding, a P-type encoding and a B-type encoding. A picture which undergoes an I-type, P-type or B-type encoding will be referred to as a type I, P or B picture, respectively.

In a step S1, a picture complexity PCX is calculated for each type of picture I, P and B. Each picture complexity PCX is a product of the number of bits NOB produced by a recent encoding and the quantization parameter value QPAR used in the recent encoding. Each picture complexity PCX is in fact a past encoding experience for the type of encoding concerned. It can be used to predict, for a certain quantization parameter value QPAR, which number of output bits will be obtained if a subsequent picture is encoded. The picture complexity PCX for the type encoding to be used, may be divided by the quantization parameter value QPAR. The outcome of this division is a prediction, based on the past encoding experience, of the number of output bits which will be obtained.

In a step S2, a group-of-pictures complexity GCX is calculated. The group-of-pictures complexity GCX is the sum of three terms. Each term relates to a different picture type and is the picture complexity PCX of the type concerned, multiplied by the number M of pictures of the type concerned within a group of pictures, divided by a weighing factor K for the type concerned. The group-of-pictures complexity GCX is also in fact a past encoding experience, broader than the picture complexity PCX, which can be used to calculate a value for the quantization parameter QPAR. For example, the group-of-pictures complexity GCX may be divided by a desired number of output bits to be obtained for N subsequent pictures. Accordingly, a value for the quantization parameter QPAR is obtained with which, based on past encoding experience, the encoding of the N subsequent pictures should produce the desired number of bits. The latter, however, need not be so.

In a step S3, a picture-coding estimation PCE is calculated for each type of picture I, P and B. The picture-coding estimation PCE is product of a first and a second term. The first term is the picture complexity PCX of the type concerned divided by the weighing factor K of the type concerned. The second term is an initial value VALint for a group encoding-target GCT divided by the group-of-pictures complexity GCX calculated in step S2. The group encoding-target GCT is the number of bits which should be obtained by encoding the current picture and the N–1 subsequent pictures. The initial value VALint for the group encoding-target GCT is the number of bits which will be outputted from the output buffer during a period covering the current picture and the N–1 subsequent pictures. Thus, the picture-coding estimation PCE is based on the following target: the amount of data which goes into the output buffer OBUF should equal the amount of data which is removed from the output buffer OBUF during the period concerned. The second term of the picture-coding estimation PCE represents a value for the quantization parameter QPAR with which, based on past encoding experience, this target should be achieved.

It should be noted that initial value VALint of the group coding target GCT depends on the joint bit-rate control messages received by the encoder. It has been explained hereinbefore with reference to FIG. 3, that these joint bit-rate control messages define a bit rate profile for the encoder. The bit-rate profile determines the amount of bits the number of bits which will be outputted from the output buffer OBUF during a period covering the current picture and the N–1 subsequent pictures. Since this number of bits is the group coding target GCT, the joint bit-rate control messages thus define this target. Consequently, the picture coding estimation PCE depends on the joint bit-rate control messages.

In a step S4, a predicted buffer fullness BF[nextI] at the next I-picture is calculated. The predicted buffer fullness BF[nextI] is based on the initial value VALint for the group-coding target GCT and the picture-coding estimation PCE derived therefrom. The predicted buffer fullness BF[nextI] is the current fullness BF[now] of the output buffer plus a sum $\Sigma$ of picture-coding estimations which comprises a picture-coding estimation PCE for each picture until the next I-picture, minus the number of bits OUT[nextI] which will be outputted from the output buffer until the next I-picture.

In a step S5, a buffer fullness surplus $\Delta BF$ is calculated. The buffer fullness surplus $\Delta BF$ is the difference between the predicted buffer fullness BF[nextI] and a desired buffer fullness BF[des] at the next I picture. The desired buffer fullness BF[des] is preferably defined in such a manner that it corresponds to an input buffer at a decoding end being substantially filled with data just before decoding the I picture.

In a step S6, an adapted value VALadp for the group encoding-target GCT is calculated. The adapted value VALadp for the group encoding-target GCT is the initial value for VALint the group encoding-target GCT, which is the number of bits which will be outputted from the output buffer during a period covering the current picture and the subsequent N−1 pictures, minus the buffer fullness surplus ΔBF.

In a step S7, a picture encoding-target PCT is calculated for encoding the current picture. The picture encoding-target PCT is based on the adapted value VALadp of the group encoding-target GCT in the same manner as the picture-coding estimation PCE is based on the initial value VALint of the group encoding-target GCT. The picture encoding target PCT is a product of a first term and a second term. The. first term is the picture complexity PCX belonging to the type of the picture to be encoded, I, B or P, divided by the weighing factor K used for that type. The second term is the adapted value VALadp for the group encoding target GCT divided by the group-of-pictures complexity GCX.

In a step S8, the picture encoding target PCT is verified so as to obtain a verified picture encoding target PCTver. In this step, it is checked whether or not an underflow or an overflow will occur at a decoding end if the encoding of the current picture produces a number of bits equal to the picture encoding target PCT. If there is neither underflow nor overflow, the verified picture encoding target PCTver will equal the picture encoding target PCT, that is, the picture encoding target PCT is not changed. If, however, the picture encoding target PCT will lead to underflow or overflow, the picture encoding target PCT is effectively clipped in replacing it by a value for which neither underflow nor underflow occurs.

In a step S9, the quantization parameter value QPAR is controlled during the encoding of the current picture in the following manner. The quantization parameter value QPAR is the sum of a first term and a second term. The first term is the picture complexity PCT of the type concerned divided by the verified picture encoding target PCTver. The second term is the product of a deviation-from-target ΔTGT and a reaction parameter RP. The deviation-from-target ΔTGT is the number of bits NOBP produced thus far by encoding the current picture, minus the verified picture encoding target PCTver multiplied by the ratio of the time lapsed thus far t−t0 in encoding the current picture, and the picture period Tp. The reaction parameter RP is 512 divided by the bit-rate R of the MPEG data stream DS.

With regard to the quantization parameter control QPAR, the following is noted. The first term is a global or long-term strategy for controlling the quantization parameter value QPAR. Let is be assumed that the picture encoding target is not clipped, meaning that the verified picture encoding target PCTver equals the picture encoding target PCT. In that case, the first term corresponds to the weighing factor K for the picture concerned multiplied by the group-of-pictures complexity GCX divided by the adapted value VALadp of the group encoding-target GCT. The group-of-pictures complexity GCX consists of a sum of products of "number of bits actually produced in the recent past" and "the quantization parameter which was applied". Thus, the first term effectively represents a value for the quantization parameter QPAR which, based on past experience, is expected to result in a number of desired bits. The second term is a local or short-term strategy for adjusting the quantization parameter QPAR. It is a kind of safety measure which prevents the encoding from producing a number of bits which deviates to a relatively large extent from the targeted number of bits being the verified picture encoding target PCTver.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes the implementation of some functional elements or all functional elements as a single physical unit. For example, the output buffers of the encoders shown in FIG. 3 may be implemented as a single memory circuit as described in the International Application published under number WO 96/20568.

Although FIG. 8 illustrates an example of a method of quantization parameter control on the basis of the output bit rate, this by no means excludes other methods of quantization parameter control. All what matters, is that the extent of compression, which in the FIG. 8 method is controlled by a means of target, is calculated on the basis of the output bit rate.

Any reference sign in a claim should not be construed as limiting the claim.

What is claimed is:

1. A method of modifying a bit-rate of a data stream comprising control words, a control word defining when a data portion comprised in the data stream has to be read from an input buffer at a receiving end, characterized in that the method comprises the following steps:

determining a time interval (ΔTsw) to at least one future instant in time (T[i]+ΔTsw) at which to modify the rate so as to cause neither underflow or overflow of the input buffer;

calculating, for said at least one future instant in time (T[i]+ΔTsw), within which bounds (Rmax, Rmin) the rate can be so modified at that future instant in time, so as to cause neither underflow nor overflow of the input buffer; and modifying the rate at a future instant in time within the bounds (Rmax, Rmin) which have been calculated for the future instant of time.

2. A method of modifying the bit rate as claims in claim 1, characterized in that the future instant (T[i]+ΔTsw) when the bit rate will be modified is earlier than the instant (T[i]+ Teed) when the control words already comprised in the data stream will have taken effect (T[i]+ΔTsw<T[i]+ Teed).

3. A method of modifying the bit rate as claims in claim 1, characterized in that it comprises the following steps:

a calculation (GS4) in which a figure of merit (ΔR) is calculated for each of several different bit-rate switch times (Tsw[1], . . . Tsw[M]) supposing that the bit rate is modified at the bit-rate switch time;

a selection step (GS5) in which the bit-rate switch time is selected that provides the best figure of merit, the bit rate being modified at the selected bit-rate switch time (Tswsel).

4. The method of claim 1, wherein at least one of said bounds is calculated based on said future instant of time (T[i]+ΔTsw), a present time (T[i]) and a time period ( Teed) between the writing of a datum into an output buffer of an encoder and a reading of the datum from said input buffer.

5. An encoding arrangement comprising at least one encoder for providing an encoded data stream comprising control words, a control word defining when a data portion comprised in the data stream has to be read from an input buffer at a receiving end, characterized in that the encoding arrangement comprises control circuitry which is programmed to carry out the following steps:

- determining a time interval ($\Delta$Tsw) to at least one future instant in time (T[i]+$\Delta$Tsw) at which to modify a bit-rate of the data stream so as to cause neither underflow nor overflow of the input buffer;
- calculating, for said at least one future instant in time (T[i]+$\Delta$Tsw), within which bounds (Rmax, Rmin) the rate can be so modified at that future instant in time, so as to cause neither underflow nor overflow of the input buffer; and
- modifying the rate at a future instant in time within the bounds (Rmax, Rmin) which have been calculated for the future instant of time.

6. A method of modifying the bit-rate of a data stream comprising control words, a control word defining when a data portion comprised in the data stream has to be read from an input buffer at a receiving end, characterized in that the method comprises the following steps:

- calculating, for at least one future instant in time (T[i]+Tsw), within which bounds (Rmax, Rmin) the rate can be modified at that future instant in time, so as to cause neither underflow nor overflow of the input buffer; and
- modifying the rate at a future instant in time within the bounds (Rmax, Rmin) which have been calculated for the future instant of time;
- a calculation (GS4) in which a figure of merit ($\Delta$R) is calculated for each of several different bit-rate switch times (Tsw[1], ... Tsw[M]) supposing that the bit rate is modified at the bit-rate switch time;
- a selection step (GS5) in which the bit-rate switch time is selected that provides the best figure of merit, the bit rate being modified at the selected bit-rate switch time (Tswsel).

* * * * *